United States Patent [19]

Deacon et al.

[11] Patent Number: 4,491,948
[45] Date of Patent: Jan. 1, 1985

[54] ISOCHRONOUS FREE ELECTRON LASER

[76] Inventors: David A. G. Deacon, 754 Duncardine, Sunnyvale, Calif. 94087; John M. J. Madey, 2120 Amherst St., Palo Alto, Calif. 94306; Todd I. Smith, 685 Wildwood La., Palo Alto, Calif. 94303; William B. Colson, 3790 San Remo #1, Santa Barbara, Calif. 93105

[21] Appl. No.: 235,303

[22] Filed: Feb. 13, 1981

[51] Int. Cl.³ .............................................. H01S 3/00
[52] U.S. Cl. .................................................... 372/2
[58] Field of Search ........................................... 372/2

[56] References Cited

PUBLICATIONS

Physical Review Letters, vol. 44, No. 7, Feb. 18, 1980, pp. 449–452, Deacon and Madey, "Isochronous Storage-Ring Laser: A Possible Solution to the Electron Heating Problem in Recirculating Free Electron Lasers".

IEEE Transactions on Nuclear Science, vol. NS-26, No. 3, Jun. 1979, pp. 3827–3829, Renieri, "Free Electron Laser Amplifier Operation in Storage Ring".

IEEE Transactions on Nuclear Science, vol. NS-28, No. 3, Jun. 1981, pp. 3166–3168, Blewett et al., "Free Electron Experiment at the NSLS 700 MeV Electron Storage Ring".

David A. G. Deacon, "Theory of the Isochronous Storage Ring Laser", *HEPL Report* 854, 2/80.

*Primary Examiner*—William L. Sikes
*Assistant Examiner*—Léon Scott, Jr.
*Attorney, Agent, or Firm*—Townsend and Townsend

[57] ABSTRACT

A storage-ring free-electron laser in which the electrons remain trapped in the optical potential wells formed by the laser fields. This is accomplished by preserving the electrons' bunched structure from pass to pass.

23 Claims, 20 Drawing Figures

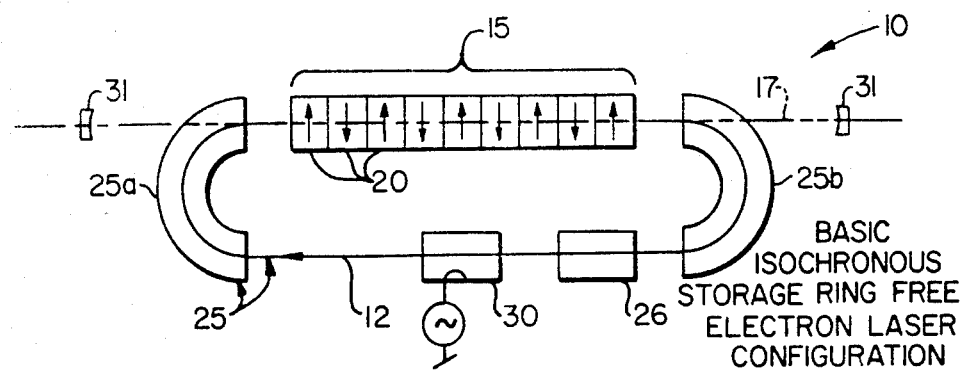
FIG._1A.
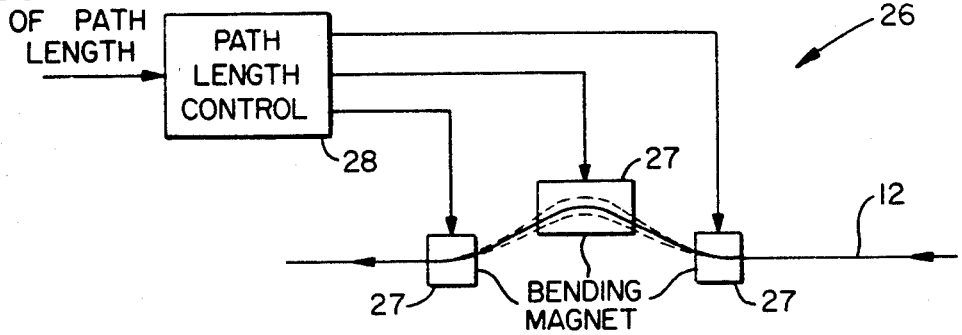
FIG._1B.
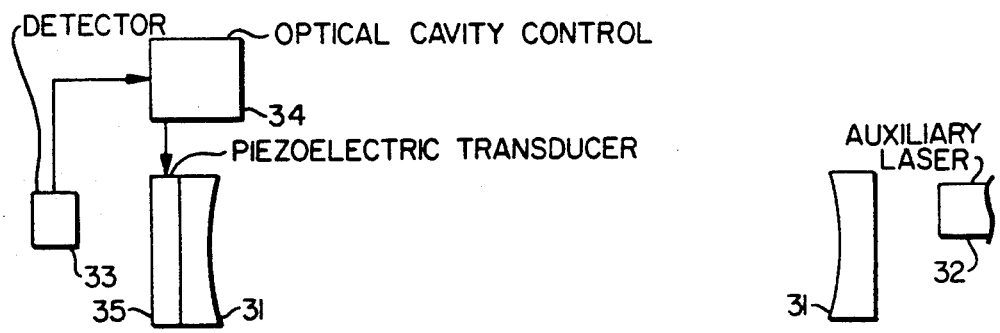
FIG._1C.
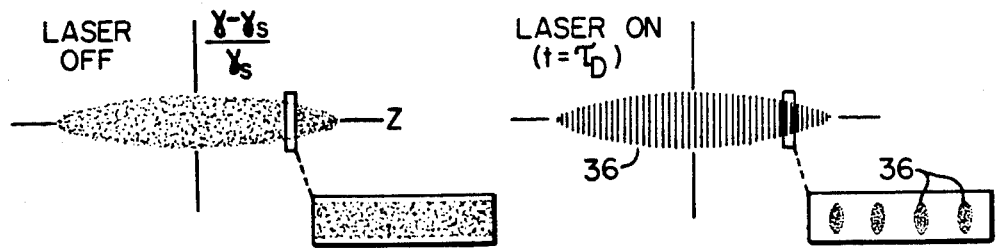
FIG._2A.  FIG._2B.

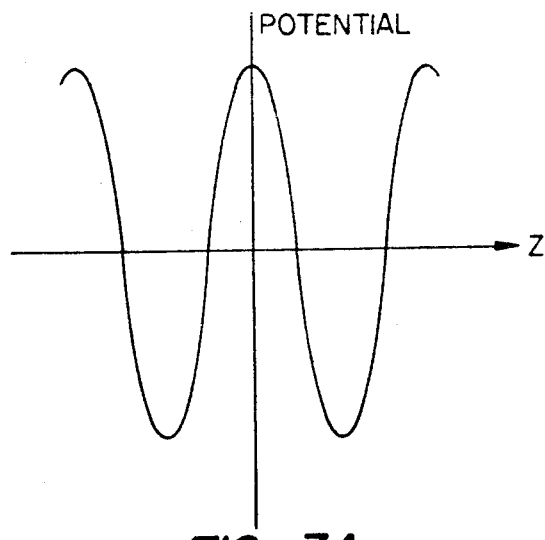
FIG._3A.
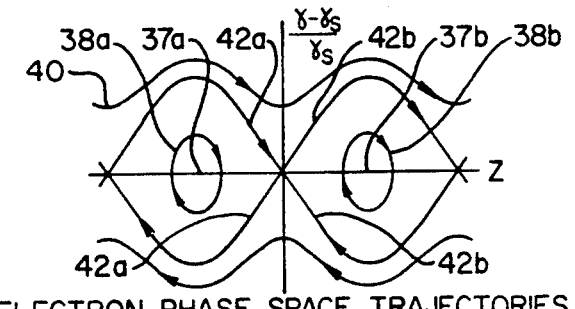
ELECTRON PHASE SPACE TRAJECTORIES
FIG._3B.
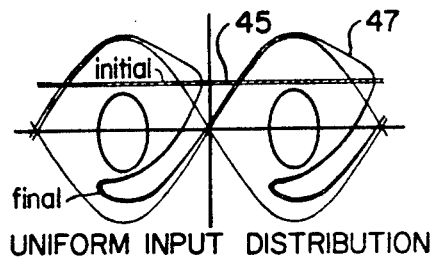
UNIFORM INPUT DISTRIBUTION
FIG._3C.
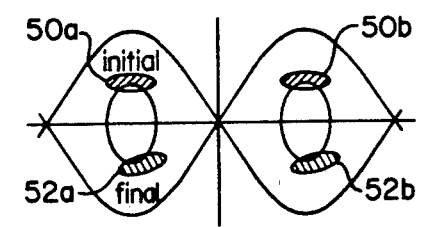
BUNCHED INPUT DISTRIBUTION
FIG._3D.

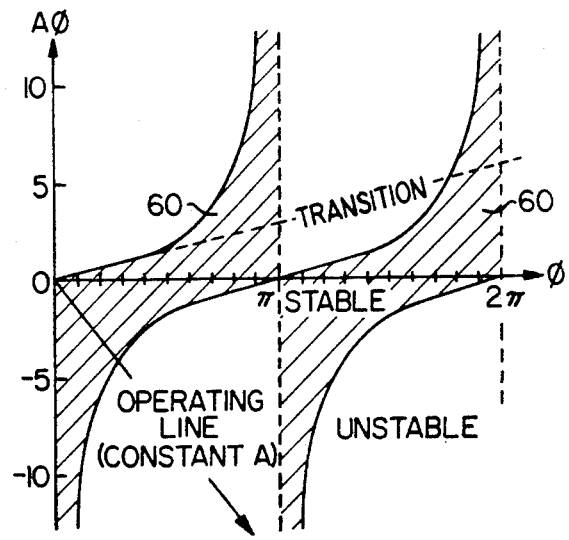
FIG._4A.
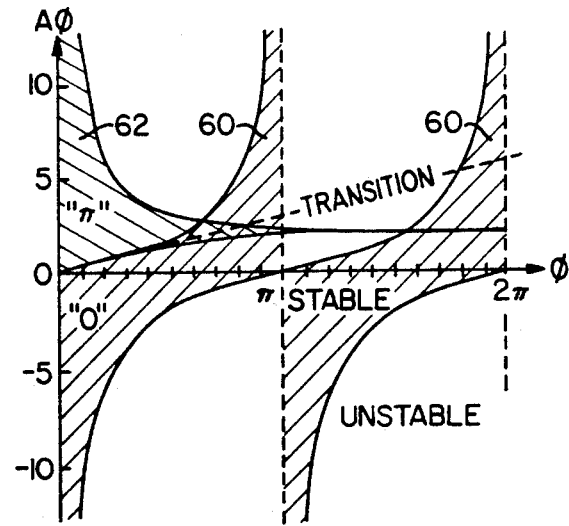
FIG._4B.
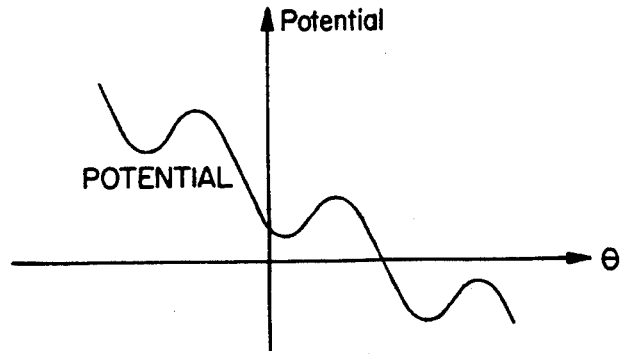
FIG._5A.

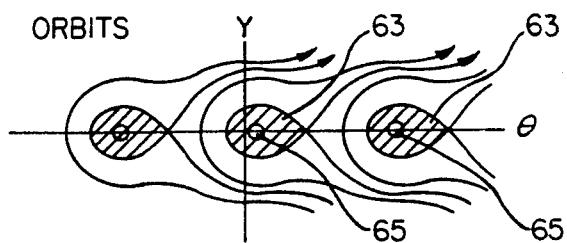
FIG._5B.
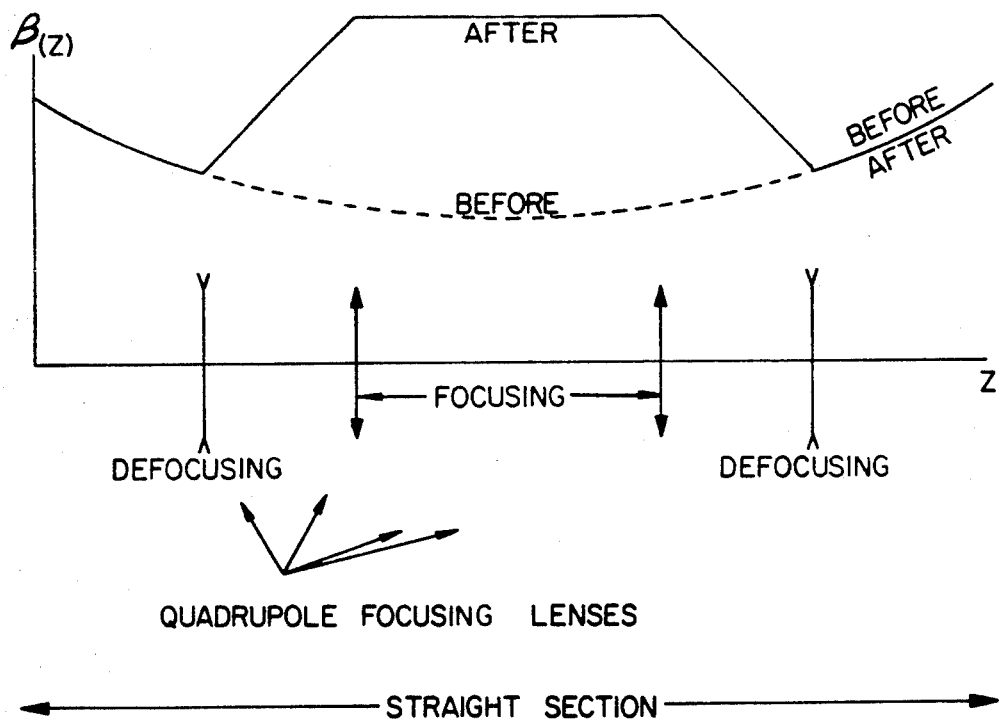
FIG._6.

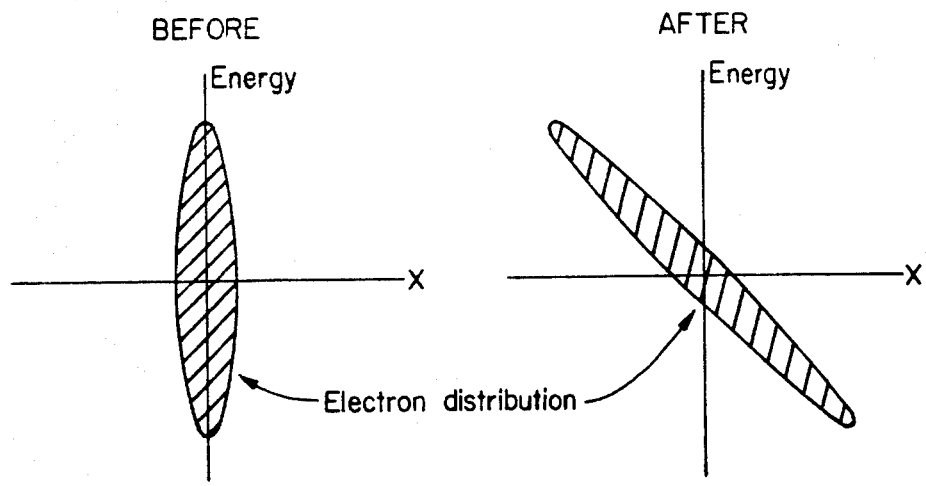
FIG._7A.
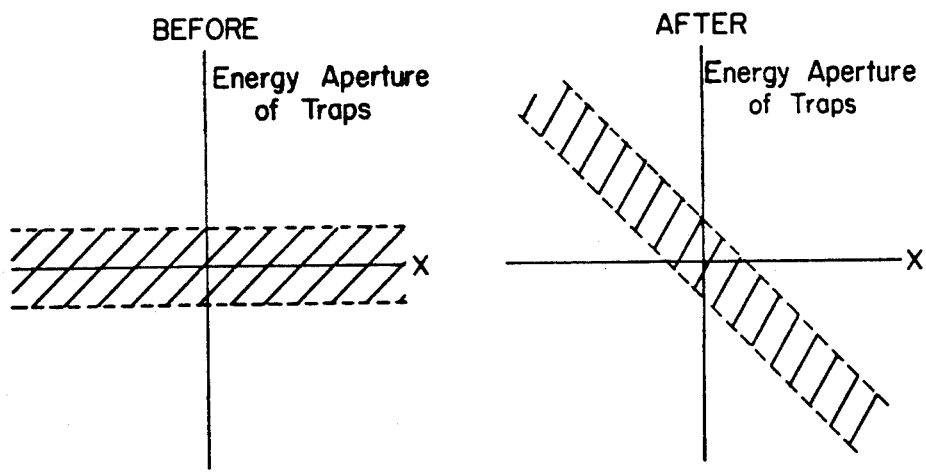
FIG._7B.

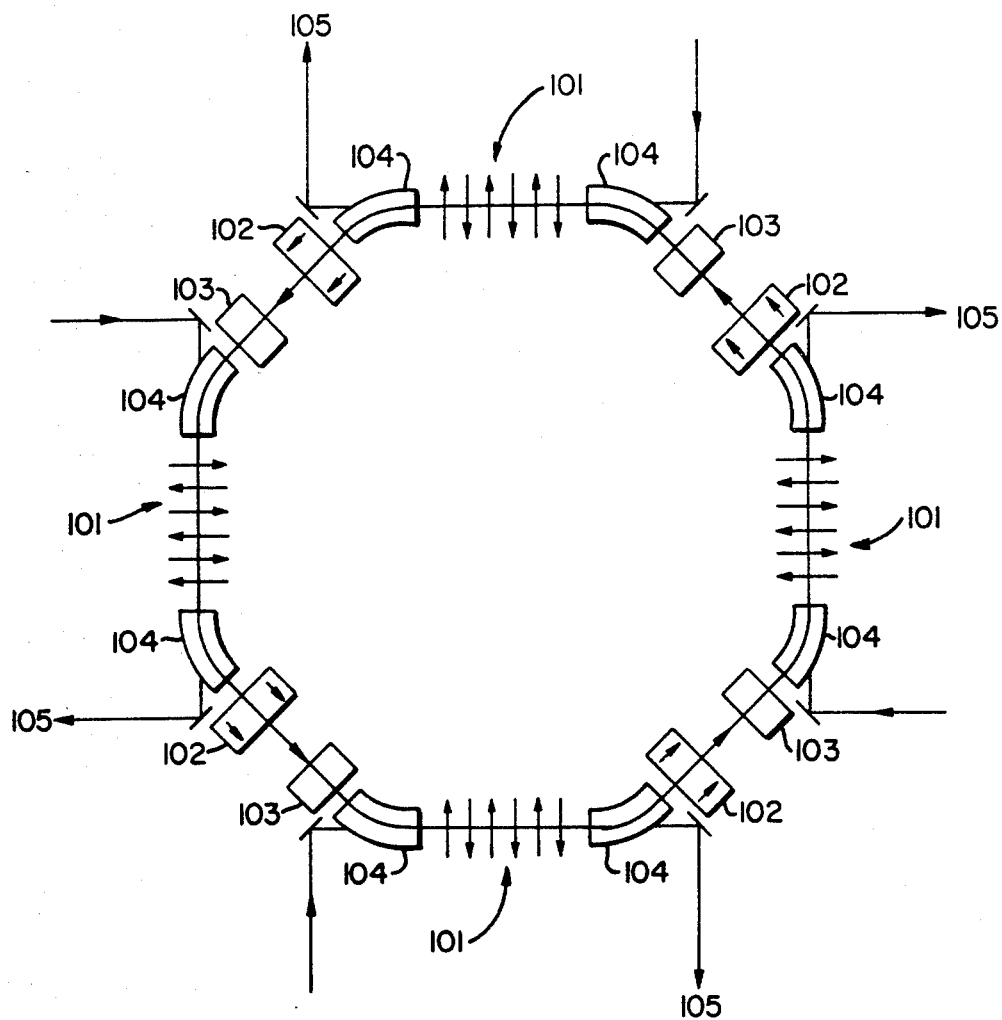
FIG._8A.
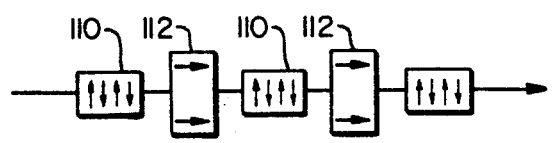
FIG._8B.

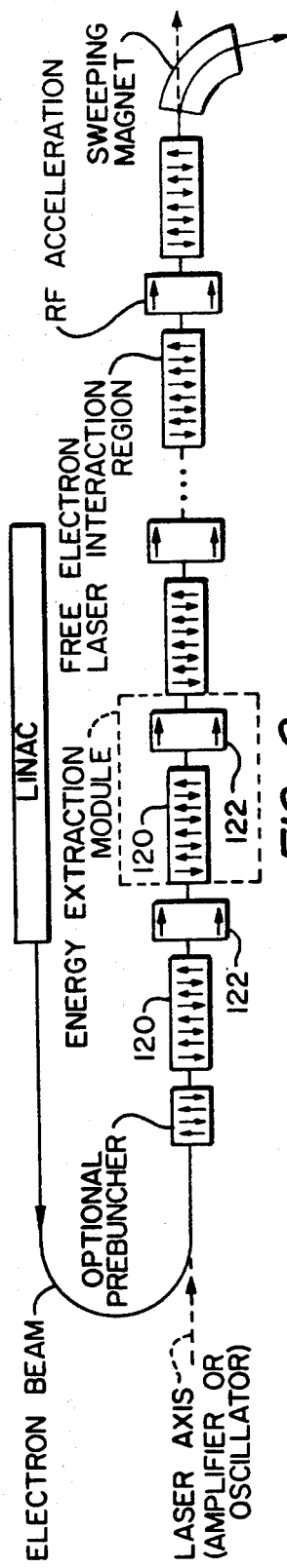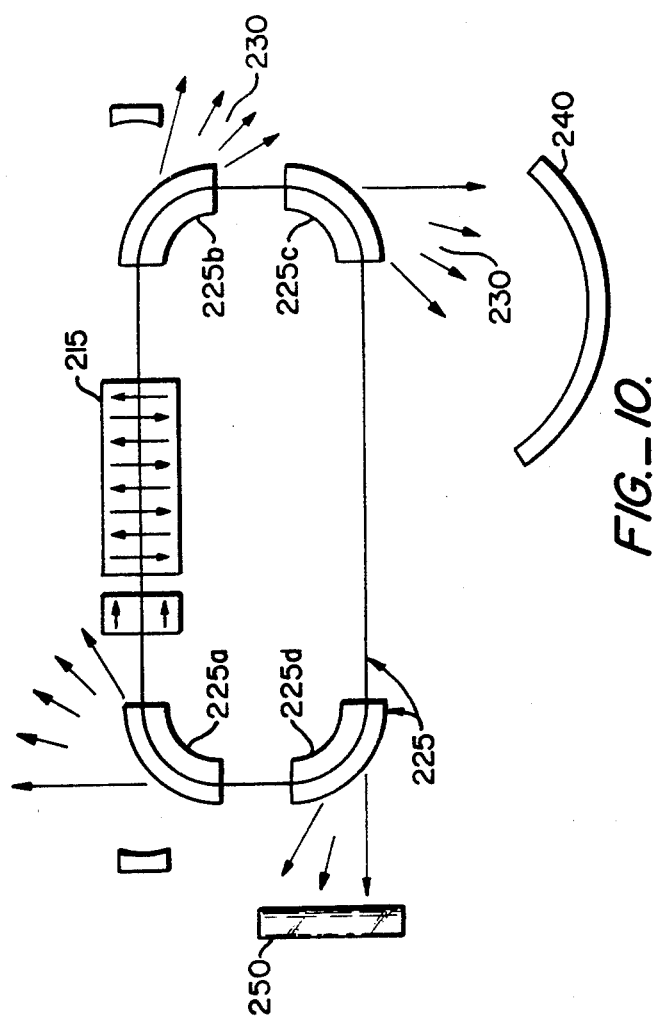
FIG._9.
FIG._10.

ISOCHRONOUS FREE ELECTRON LASER

FIELD OF THE INVENTION

The present invention relates to free electron lasers. The Government has rights in this invention pursuant to Contract No. DASG60-77-C-0083 awarded by Ballistic Missile Defense System Command, Department of the Army.

BACKGROUND OF THE INVENTION

Two desirable attributes of lasers operable in the visible and infrared are high output power and tunable output wavelength. These attributes are available individually—existing carbon dioxide lasers are capable of providing 10 kilowatts output at a fixed wavelength, and there exist tunable lasers capable of providing variable visible wavelengths at output powers ranging from milliwatts up to approximately 2 watts. However, there have not heretofore been any lasers capable of providing both of the sought after attributes in a single device.

The free electron laser as described in U.S. Pat. No. 3,822,410 has shown considerable promise in making available a tunable high power device. By way of background, a free electron laser is a device which couples the kinetic energy of a relativistic electron into the field energy of a freely propagating plane wave. The electron beam is periodically deflected by a transverse magnetic field defined by a linear array of so-called "wiggler" magnets. Alternating magnets have opposing polarities, so that the beam follows an undulating or helical path. The induced transverse velocity allows the electron to do work on the electric field of the radiation. Each time the electron is deflected, it emits a burst of radiation and the combination of the individual bursts yields a beam of coherent radiation at a wavelength given by:

$$\lambda = \frac{\lambda_0}{2\gamma^2}\left[1 + \left[\frac{eB}{mc^2}\frac{\lambda_0}{2\pi}\right]^2\right] \quad (1\text{-}1)$$

where:
- $\lambda_0$ is the wiggler magnet period;
- $\gamma$ is the electron energy divided by its rest mass energy;
- B is the magnetic field strength of the wiggler magnets;
- e is the electron charge;
- m is the electron rest mass; and
- c is the speed of light;

with e, B, m, c and $\lambda_0$ being in cgs units.

In operating such a laser, the output wavelength is most conveniently tuned by varying the electron energy (proportional to $\gamma$) or the magnetic field strength, and interesting levels of power output (say 100 watts) may be achieved. In a typical embodiment, the electrons are recirculated in a storage ring so as to make multiple passes through the laser stage. Such a device is known as a storage ring laser. An accelerator stage comprising an RF cavity in the storage ring restores to the electron beam the energy which was radiated as synchrotron radiation and that which was transferred to the electromagnetic wave in the laser.

The inherent nature of the storage ring is that the electrons move in a potential well (the RF "bucket") and undergo bunching on the order of a meter or so. The electrons are characterized by an equilibrium energy distribution that is a function of the storage ring. In operation, the laser field produces potential wells ("optical traps") so that the electron beam entering the laser magnet stage undergoes a further bunching on the scale of the optical wavelength. While a uniformly distributed beam (constrained only by the RF bucket) can only exchange energy to second order in the radiation field, a bunched beam can exchange energy to first order. However, one of the difficulties encountered in the design of a storage ring laser arises from the laser-induced heating of the electrons. The laser phase-dependent energy loss induces additional energy spread on the electron beam when the electrons enter the laser with random optical phase. The spread is typically greater than the (second-order) mean radiated energy, and the efficiency is limited by the dissipation which must be introduced to control the spread. Thus, the bunches formed on a given pass through the laser stage tend to be lost, so that on the next pass, a new bunching regime must be established. Accordingly, the output power in the laser stage has tended to be limited to but a few percent of the synchrotron radiated power in the storage ring.

SUMMARY OF THE INVENTION

The present invention provides a high efficiency free-electron laser characterized by tunable output at power levels in the range of 10 kilowatts/amp or more.

In a storage-ring embodiment of the present invention, the bunched structure of the beam is maintained from pass to pass by suitably constraining the storage ring and accelerator stages so that the electrons remain trapped in the optical potential wells formed by the laser fields. As such, the electron phase space trajectories are closed elliptical orbits encircling the phase stable point. The requirement that traps exist and that the electrons execute stable orbits in phase space within the traps sets constraints on the momentum compaction factor of the storage ring, the acceleration voltage of the RF cavity, and the magnitude of the allowable transverse motion.

The major constraint in order to achieve this result is that the system be isochronous. That is, the electron orbit time from exiting the laser stage to re-entering the laser stage on the next pass is kept substantially independent of the electron state parameters (energy, direction, position in bunch) at the point of exiting the laser stage. In such an isochronous system, since the electron orbit time is independent of the electron initial conditions, an electron's optical phase is correlated from pass to pass, and the electrons can radiate energy without excitation. On a microscopic scale, the equations of motion lead to the existence of stable electron bunches on the scale of the optical wavelength. The phase at which the electron bunches are injected into the laser on each pass is chosen to optimize the first-order energy transfer, greatly improving the gain and power output. The energy radiated in the laser is replenished by the RF accelerating system in the storage ring, allowing continuous operation at high efficiency.

According to a further aspect of the present invention, the laser stage is used primarily as a buncher, and the system is operated to provide a source of coherent synchrotron radiation. In a normal case, synchrotron radiation is confined to a cone having a characteristic angle of $1/\gamma$, and the output represents a stochastic superposition of individual bursts of radiation. However, when the laser has introduced bunching on the order of the optical wavelength, and when this bunching is preserved from pass to pass, the amplitudes of the component of the synchrotron radiation at the bunch separation frequency add to produce a coherent enhancement at that frequency.

According to yet a further aspect of the present invention, a gain expanded configuration is utilized in order to provide a large ratio of the energy dimension of the optical traps relative to the equilibrium energy spread of the electron beam. This is implemented by imposing a transverse gradient on the magnetic field of the wiggler magnets in such a way that the central energy of the trap is displaced according to the energy deviation of the particles at a given position.

BRIEF DESCRIPTION OF THE DRAWINGS

FIG. 1A is a schematic view of a storage ring free electron laser;

FIGS. 1B and 1C are schematic views of the orbit and laser length stabilization systems;

FIGS. 2A and 2B are phase space plots showing the electron distribution without and with the laser field;

FIGS. 3A-D show the potential and the phase space trajectories for the laser section;

FIGS. 4A and 4B are plots showing the stability constraints on the laser phase advance and the momentum compaction factor;

FIGS. 5A and 5B show the potential and the phase space trajectories for the combined laser and storage ring system;

FIG. 6 is a plot showing the effect of a matched focusing insertion in a straight section of the storage ring;

FIGS. 7A-B are hybrid phase space plots showing the tilting of the electron distribution and trap energy aperture by using a gain expanded configuration;

FIG. 8A is a schematic of an alternate embodiment of a storage ring free electron laser;

FIG. 8B is a schematic showing multiple laser subsections with interspersed acceleration stages;

FIG. 9 is a schematic of a linear embodiment of the present invention; and

FIG. 10 is a schematic showing the production and utilization of coherent synchrotron radiation.

DETAILED DESCRIPTION OF THE INVENTION

FIG. 1A is a schematic view of a storage ring free electron laser system 10. The principles of operation and a more detailed description of the construction of free electron lasers are set forth in U.S. Pat. No. 3,822,410, issued July 2, 1974 to John M. J. Madey, the disclosure of which is hereby incorporated by reference. A relativistic electron beam 12, having been generated by any convenient means such as a particle accelerator (not shown) is introduced into a laser section 15 along an axis 17 that defines the optical axis of the system. The electrons in beam 12 have a mean energy $\gamma mc^2$ where m is the electron mass, c is the speed of light, and $\gamma = 1/\sqrt{1 - v^2/c^2}$. Laser section 15 comprises a plurality of regularly spaced wiggler magnets 20 having alternate polarities so that beam 12 is caused to undergo undulating transverse motion. Wiggler magnets 20 are characterized by a magnetic field magnitude B, and there are N wiggler magnets with a periodic spacing $\lambda_0$.

The electron beam is circulated in a storage ring 25 having an injection section 25a and an extraction section 25b so that the beam may make multiple passes through laser section 15. The beam path outside laser section 15 is characterized by a length L. A path length adjustment system 26 is located in a straight section of storage ring 25, and operates to compensate for changes in orbit length arising from changes in the storage ring magnetic fields and the like. System 26 is shown schematically in FIG. 1B. Bending magnets 27 introduce a variable path length excursion, and are controlled by a feedback system 28 which monitors an appropriate path length dependent parameter (such as total synchrotron power or laser power). Feedback system 28 compares this parameter with an optimum value, and adjusts magnets 27 accordingly. Between extraction and injection, beam 12 is passed through an RF accelerating cavity 30 which restores to the beam the energy lost in laser section 15. Cavity 30 is characterized by an accelerating voltage V.

As will be discussed in detail below, the action of laser section 15 is to induce a longitudinal bunching in beam 12, and efficient operation is achieved according to the present invention by configuring storage ring 25 and accelerating cavity 30 so that the bunching is preserved from pass to pass. Storage ring 25 is characterized by numerous design parameters well known to those in the art. Among those of interest in the present case is the momentum compaction factor, $\alpha$, which is defined as the ratio of proportional orbit length deviation to proportional energy deviation. Typical values of $\alpha$ for existing and proposed storage rings are in the range of $2 \times 10^{-4}$ to $2 \times 10^{-1}$. As will be discussed below, the present invention is most advantageously implemented with a storage ring characterized by a value of $\alpha$ near or below the lower end of the normal range. In such a case, second order effects, characterized by the parameter $\alpha_2$, become significant. Also significant is the emittance, $\epsilon$, which is the product of the mean radius of the stored electron beam and its angular divergence. Typical values of $\epsilon$ are in the range of $1 \times 10^{-9}$ to $5 \times 10^{-7}$ meter-radians.

Storage Ring Effects

FIG. 2A is a phase space distribution showing the structure of the beam distribution prior to the establishment of a laser field in laser section 15. As is well known to those in the storage ring art, the nature of electron storage rings is such that the circulating electrons become bunched. The mechanism for the bunching arises from the presence of potential wells, with the bunching typically on the scale of a meter or so. The energy spread (vertical dimension of distribution) is Gaussian in nature, being characterized by a standard deviation $\sigma_e$ which is basically a function of the storage ring, being determined by the quantum fluctuations in emission of synchrotron radiation. The synchrotron radiation produces excitation (that is, an increase in the energy spread) arising from stochastic emission, but also produces a damping of the energy distribution since the higher energy electrons tend to give off higher energy photons and thus damp back toward the mean energy. This energy extent depends on the RF potential well (sometimes referred to as the "bucket"), which is itself determined by the accelerating votage, V, of RF accelerating cavity 30 and the momentum compaction factor, $\alpha$, of the storage ring.

To carry out a more quantitative analysis of the electron motion in optical phase, consider the evolution from pass to pass of an electron's longitudinal coordinates at the entrance of laser section 15. In each pass through storage ring 25, the energy deviation, $\delta E(t)$, from the synchronous energy, $E_s$, ($\delta E(t) = E(t) - E_s$) is incremented by the acceleration in the RF cavity (potential $eV$, harmonic number h), and the time displacement, $\tau$, from bunch center is shifted by the difference in orbit time from the orbit time, $T_o$, of the central particle. The latter is proportional to the energy deviation and the square of the transverse amplitude $x_{max} = a(\beta_t)^{\frac{1}{2}}$.

$$\Delta \delta E = eV \sin(2\pi h\tau/T_o) \quad (2\text{-}1)$$

$$\frac{\Delta \tau}{T_o} = -\alpha \frac{\delta E}{E_s} - \frac{a^2 L}{4\beta_t c} - \ldots \quad (2\text{-}2)$$

The lowest order, and in the continuous approximation, these equations can be combined to produce a pendulum equation. Thus, in storage ring 25 without laser section 15, there exists a line of phase stable points about which the electrons stored in the bunch follow stable trajectories in phase space, being constrained in the pendulum potential well (the "bucket"), their motion following that of a slowly oscillating pendulum. Electrons following open or unstable trajectories corresponding to a rotating pendulum are lost. A secondary line of phase stable points exists at an energy separation from the primary line of magnitude $\alpha/\alpha_2$. For small $\alpha$ or large $\alpha_2$, the two lines of phase stable points coalesce, forming buckets with a smaller energy aperture. In order to maintain the lifetime of the trapped charge at an acceptably high level, $\alpha_2$ must be small enough to maintain a certain minimum energy aperture $$\alpha_2 \leq \frac{\alpha}{2(\delta\gamma/\gamma)_{min}} \quad (2\text{-}3)$$

It may also be necessary to increase the buckets in the longitudinal dimension, which may, as is well known, be accomplished by flattening the bottoms of the potential wells. A typical way of doing this is to add additional RF cavities at the odd harmonics.

Laser Effects

Laser system 10 may be operated as an amplifier or an oscillator. Laser mirrors 31 are shown as defining a resonant optical cavity for oscillation. The length of the optical cavity is stabilized to a precision of about a quarter wavelength, which is typically done interferometrically, as shown schematically in FIG. 1C. An auxiliary laser 32 directs a beam across the optical cavity to a detector 33. Changes in transmission are fed to a feedback system 34 which applies a correction signal to a piezoelectric crystal 35 attached to one of mirrors 31. Whether or not mirrors are necessary for oscillation depends on whether the gain is sufficiently high. The mirrors serve in part to extend the interaction time of the stimulating radiation and the electron beam.

The laser field (whether system 10 is operated as an amplifier or an oscillator) is characterized by an amplitude $E_L$, and is responsible for establishing optical traps including closed orbit regions, as will be discussed in more detail below. The electrons between the traps tend to damp down into the traps since that represents a lower energy state, thus producing a bunched structure comprising bunches 36, as shown in FIG. 2B. It should be noted, however, that the bunched electrons within the traps retain the same equilibrium energy spread. It therefore becomes an important design factor that the laser traps be large enough in energy extent so that the equilibrium energy distribution is well contained within the traps. This is accomplished by utilizing a high laser field in laser section 15. In the case of an amplifier, this means that the input laser intensity must be high, while if the system is used in the oscillator mode, the power level within the optical resonant cavity must be high. This will now be discussed in greater detail.

The motion of the electrons in the field of a free electron laser is also governed by a pendulum equation but now on the much smaller scale of the optical wavelength.

$$\ddot{\theta} = -\Omega^2 \sin \theta (\Omega^2 \equiv 2e^2 E_L B/\gamma^2 m^2 c^2) \quad (3\text{-}1)$$

where:
$\theta(t) \equiv k\ \delta z(t)$;
k is the laser wave number;
$\delta z$ is the longitudinal deviation from the resonant particle;
$E_L$ is the laser field amplitude; and
B is the magnetic field of the wiggler. The laser establishes another, weaker set of potential wells (traps) with depth proportional to the laser phase advance, $\phi \equiv \Omega N \lambda_o/c$, in one pass through the N wiggler periods. Note that the laser phase advance is proportional to the square root of the laser field, $E_L$, (fourth root of the laser intensity).

The nature of the electron motion within the laser traps may be seen with reference to FIGS. 3A–D. Liouville's theorem implies that the interaction between electron beam 12 and the electromagnetic field conserves the phase space volume of the electron distribution. The electrons in the free electron laser move in a set of potential wells created by the interaction of their transverse velocity and the radiation field. The characteristic of a pendulum equation of motion is a cosinusoidal potential, as shown schematically in FIG. 3A.

FIG. 3B is a two-dimensional phase space plot showing proportional energy deviation along the vertical axis and longitudinal position along the horizontal axis. The potential wells are spaced according to the optical wavelength, and the central points 37a and 37b along the horizontal axis are shown for two adjacent wells. An electron at the resonant energy, that is, having $\gamma = \gamma_r$, would correspond to a point lying on the horizontal axis. Electrons near the resonant energy are trapped in the wells, and follow closed elliptical orbits 38a and 38b centered about phase stable points 37a and 37b, respectively. On the other hand, an electron having a sufficient energy deviation from the resonant energy moves across the potential well in an open orbit such as that designated 40. Also shown are orbits 42a and 42b along which electrons oscillate between the peaks of the potential wells, tracing out the separatrix.

FIG. 3C is a phase space plot showing the effect of one pass through laser section 15 on a beam having a uniform longitudinal distribution. The initial uniform beam distribution is represented as a horizontal narrow band 45 having a narrow energy distribution but a uniform spatial distribution. Upon the passage of the beam through laser section 15, the distribution becomes distorted into long filaments, as shown by final distribution 47. A portion of the initial distribution is trapped in the closed orbit region while the remainder of the electrons travel freely across many traps in their own open orbits. It is noted that the first order energy exchange with the field averages to zero where the initial electron distribution is uniform, leaving only the second order effect to produce gain.

FIG. 3D shows a bunched input distribution as denoted by initial bunches 50a and 50b. Bunches 50a and 50b are contained entirely within the potential wells, as indicated by the fact that the final distributions, denoted as 52a and 52b, are also bunched within the potential wells. With the bunches remaining trapped within the potential wells, the energy exchange occurs to first order in the radiation field so that efficiency is greatly improved and the gain strongly enhanced. The present invention is drawn to techniques for improving the trapping of the electrons within the potential wells in order to achieve these results.

Combined System

The precise nature of the traps and the symmetric elliptical orbits shown in FIGS. 3A-D are changed when the effects of storage ring 25 and accelerating cavity 30 are taken into effect. The complete system can be described by a non-linear time-dependent Hamiltonian incorporating both the storage ring and the laser effects, the time dependence arising from the motion of the electrons in and out of the laser region and the nonlinearity stemming predominantly from the laser pendulum equation [Equation (3-1)]. Separate constraints will now be developed, first as required for the existence of traps so that regions of stability may be found, and second as required for the traps to be large enough to hold the equilibrium energy distribution.

Although the detailed problem must be studied numerically, the existence of the traps in the combined laser-ring system can be established through a linearized calculation. Linearizing Equations (2-2) and (3-1) about the resonance energy $\delta E = \delta E_r$ and $\theta = 0$, neglecting the variation of $\tau \simeq \tau_0$ across an optical wavelength in Equation (2-1), and normalizing the energy variable to the trap size, it can be shown that the discrete transformation undergone by the electrons in one circuit can be written as $$\begin{bmatrix} \theta \\ y \end{bmatrix}_{n+1} = \begin{bmatrix} 1 & -A\phi \\ 0 & 1 \end{bmatrix} \left( \begin{bmatrix} \cos\phi & \sin\phi \\ -\sin\phi & \cos\phi \end{bmatrix} \begin{bmatrix} \theta \\ y \end{bmatrix}_n + \begin{bmatrix} -D \\ U/\phi \end{bmatrix} \right) \quad (4\text{-}1)$$

where the following normalized variables and parameters have been defined:

$y(t) \equiv (4\pi N/\phi)(\delta E/E_s)$, the normalized energy;
$A \equiv (kL/4\pi N)\alpha$, the exterior momentum compaction;
$U \equiv (4\pi N/E_s)eV \sin(2\pi h\tau_0/T_0)$, the cavity acceleration; and
$D \equiv (kL/4\beta_t)a^2$, the mean square transverse amplitude, which is proportional to emittance.

The character of the solution is determined by the transformation matrix which acts on the coordinate vector $(\theta, y)_n$. Since the transformation is conservative, both eigenvalues must have unity modulus for a stable solution to exist. This requirement restricts the values of the normalized exterior momentum compaction, A, and the laser phase advance, $\phi$, to lie between the boundaries $$A = (2/\phi)\tan(\tfrac{1}{2}\phi) \text{ and } A = -(2/\phi)\cot(\tfrac{1}{2}\phi). \quad (4\text{-}2)$$

FIG. 4A is a plot of $A\phi$ against $\phi$, with the zone of stability being shown as hatched regions 60. Similarly, by linearizing around the $\theta = \pi$ point, it can be shown that there is another zone of stability within the boundaries $$A = (2/\phi)\tanh(\tfrac{1}{2}\phi) \text{ and } A = (2/\phi)\coth(\tfrac{1}{2}\phi). \quad (4\text{-}3)$$

FIG. 4B is a plot of $A\phi$ against $\phi$, with this "$\pi$"-phase stable region being shown as a hatched region 62. Electrons can be trapped in the optical potential wells when the operating parameters fall within the shaded region.

If the transport system of storage ring 25 is completely isochronous (A=0), the operating point traces out a line with zero slope as the power grows, and some electrons will always be trapped. For nonzero A, the stable region becomes limited to a set of widely spaced intervals. It is clear that at low power, some stable orbits will always exist, although the achievable laser intensity may be small. To increase the allowable operating power level, A should be reduced; a value for the momentum compaction in the region $$|A| \leq 1 \quad (4\text{-}4)$$

is optimum.

As A approaches unity, the phase focusing produced in the storage ring begins to cancel that of the laser, and phase stability becomes impossible. Therefore, the momentum compaction must not be allowed to fluctuate too close to the transition region. Thus, a large value of $kL/4\pi N$ means that the optimum value for the momentum compaction, $\alpha$, is small. This will be shown below with reference to specific numerical examples.

The size of the optical traps is determined by nonlinear effects in Equation (3-1) and cannot be obtained from the linearized analysis. However, if the time dependence of the Hamiltonian is ignored, a constant of the motion can be derived which includes the nonlinear effects of Equation (3-1). This approximation is valid deep in the stable regions, where the normalized Hamiltonian, for $\phi << 1$, is given by:

$$H = -\cos\theta - (U/\phi^2)\theta + \tfrac{1}{2}(1-A)[Y - D/\phi(1-A)]^2. \quad (4\text{-}5)$$

The effective mass is proportional to the deviation of the momentum compaction parameter from unity, and the phase slip, D, introduces a shift of the energy zero.

The cosinusoidal (pendulum) potential is distorted by an extra term of constant slope proportional to the voltage U. FIG. 5A is a plot of the potential as a function of the normalized longitudinal deviation from bunch center, $\theta$, with the above-mentioned condition that the laser phase advance, $\phi$, is small. FIG. 5B is a phase space plot showing the stable orbit regions, denoted as shaded areas 62 on the plot. It should be noted that the orbits in the new system are no longer symmetric about the zero-phase point, and net energy exchange can occur. The extrema of the potential occur for $\sin\theta = U/\phi^2$, and define the fixed points 65 of the system. The separatrix for each stable fixed point crosses itself at the unstable fixed point, and encircles the stable fixed point. The saddle and center points are symmetrically placed about $\theta = \pi/2$ modulo $2\pi$. Each particle traces out a smooth trajectory of constant H, so that adjacent particles circulate about the center. Clearly, this imposes a limit on the magnitude of the RF acceleration. As the voltage is increased, the slope imposed on the potential grows larger, the two fixed points move closer together, and the region of phase space enclosed by the separatrix eventually will vanish. The voltage, which is proportional to the energy extraction rate, must be kept smaller than $$U/\phi^2 \leq 1 \qquad (4\text{-}6)$$

in order to retain trapping area.

The normalized energy aperture, $Y_{max}$, of the trap can be calculated from the Hamiltonian, and is given by:

$$Y_{max} = \frac{1}{\sqrt{1-A}}\left[4\sqrt{1-U^2/\phi^4} + \frac{4U}{\phi^2}\sin^{-1}\frac{U}{\phi^2} - \frac{2\pi U}{\phi^2}\right]^{\frac{1}{2}} \qquad (4\text{-}7)$$

THe parameters influencing the aperture are the momentum compaction, A, and the energy extraction rate $U/\phi^2$. For small $U/\phi^2$, the dependance is the same as derived from the linear analysis. The additional effects of the nonlinearity of the pendulum equation limit the longitudinal extent of the traps to a value depending only on the voltage through the ratio $U/\phi^2$. As U depends on $\tau$, traps will only exist over a certin range in longitudinal displacement.

The transverse motion of the electrons has several effects on the storage ring laser. There is a path-length-related phase shift given by the mean square transverse amplitude D, which reduces the laser energy exchange. As in Equation (4-6), the laser energy loss must remain at least as large as the RF acceleration for traps to exist. A calculation of the energy transfer from Equation (3-1) yields its dependence on D, from which one can obtain, for $\phi<<1$, $$\sin[D/2(1-A)]/[D/2(1-A)] > U/\phi^2. \qquad (4\text{-}7)$$

The transverse motion in the curved sections of storage ring 25 also influences the isochronism of the system. Since the tranverse motion is oscillatory, the transverse phase advance may be chosen so that the induced longitudinal displacements cancel over the exterior arc of storage ring 25. The requirements for this to occur in an arc of length L are:

$$\int_O^L \frac{\sqrt{\beta(s)}}{\rho(s)} \cos[\Phi(s)]ds \leq \frac{\sqrt{\pi/\epsilon}}{K} \qquad (4\text{-}8)$$

and $$\int_O^L \frac{\sqrt{\beta(s)}}{\rho(s)} \sin[\Phi(s)]ds \leq \frac{\sqrt{\pi/\epsilon}}{K} \qquad (4\text{-}9)$$

where:
  s is the path length coordinate along the storage ring trajectory;
  $\beta(s)$ is the trajectory envelope function ($\beta$-function) uniquely determined by the focusing characteristics of the storage ring;
  $\tau(s)$ is the orbit radius as a function of position along the trajectory; and $$\phi(s) = \int_O^s \frac{d\sigma}{\beta(\sigma)}$$

Since the total betatron phase advance in the storage ring must be kept away from certain resonant values, an adjustment capability must be established which leaves the above constraint unchanged. This can be done with a matched focusing insertion in a straight section of the ring. At least one of these insertions is required for both horizontal and vertical tunes. As shown in FIG. 6, such an insertion includes focusing and defocusing quadrupole lenses which do not change the $\beta$-function exterior to the focusing insertion, but only adjust the betatron phase advance.

The betatron phase advance occurring in the storage ring between any two points can be measured with a pair of pickup electrodes. The ever present small motions of the beam induce signals on each electrode which oscillate at the betatron frequency. The phase of the two signals therefore differs by the betatron phase advance occuring between the two electrodes. A measurement of the signal phase difference at the betatron frequency gives a measurement of the betatron phase advance between the two electrodes. The betatron phase advance in the bending magnets of storage ring 25 must be fixed and regulated at a certain value to maintain isochronism between successive laser sections. Thus, by measuring the phase advance by the correlation method described above, a feedback signal may be derived from this measurement and used to lock the phase advance to its desired value.

Note that while the transverse motion of the electrons within laser section 15 shifts the laser resonance energy via the incident electron angle, these shifts are oscillatory with the phase of the transverse motion and, for small emittance, can be neglected.

As discussed above, it the magnitude of the ratio of the size of the traps in the energy dimension relative to the energy spread of the electron beam is too small, the extractable laser power is reduced. This problem can be alleviated by utilizing the gain expanded configuration.

Electrons with a given energy deviation $\delta E/E$ will travel through the laser on a trajectory displaced transversely by the dispersion $\eta$ in the amount $$\delta x = \eta \frac{\delta E}{E} \qquad (5\text{-}1)$$

As shown in FIG. 7A the dispersion results in a "tilting" of the distribution in the hybrid phase space plot (energy against transverse position). Imposing a transverse gradient on the magnetic field of the wiggler magnets $$B = B_o(1 + x/x_o) \qquad (5\text{-}2)$$

results in a shift of the resonance energy $\gamma_r$ $$\gamma_r^2 = \frac{\lambda_o}{2\lambda}\left(1 + \frac{K^2}{2}\right) \qquad (5\text{-}3)$$

in the amount $$\frac{\delta \gamma_r}{\gamma_r} = \frac{K^2}{2 + K^2} \frac{\delta x}{x_o} \qquad (5\text{-}4)$$

which is proportional to the transverse position displacement $\beta x$. Since the energy aperture of the traps is centered on the resonance energy, the energy aperture becomes tilted as shown in FIG. 7B, and thereby can be made to accommodate the tilted electron distribution of FIG. 7A. The requirement that the resonance energy, which defines the central energy of the trap, displaces according to the energy deviation of the particles at that position $\delta x$, $$\frac{\delta \gamma_r}{\gamma_r} = \frac{\delta E}{E} (x) \qquad (5\text{-}5)$$

The gradient of the field can be determined and is given by:

$$B = B_o \left( 1 + \frac{x}{\eta} \frac{2 + K^2}{K^2} \right) \qquad (5\text{-}5)$$

The residual energy spread seen at a trap with transverse position $\chi$ will now be smaller than that of the entire beam. The transverse oscillations of the electrons about the position in Equation (5-1) allow electrons with a certain range of energies to populate each trap. The RMS transverse amplitude in the laser is $$\delta x_{rms} = \sqrt{\frac{\epsilon \beta}{2\pi}} \qquad (5\text{-}6)$$

where $\epsilon$ and $\beta$ are the horizontal emittance and $\beta$-function in the laser section. The effective energy spread is therefore, from Equation (5-1):

$$\left( \frac{\delta E}{E} \right)_{eff} = \sqrt{\frac{\epsilon \beta}{2\pi \eta^2}} \qquad (5\text{-}6)$$

The emittance and the $\beta$-function in the laser should be kept small so that the effective energy spread remains well contained in the energy aperture of the trap.

The energy loss of the electrons in the laser has the tendency to excite both coherent and incoherent transverse oscillations. A technique for partially cancelling the coherent oscillations is the placement of the RF acceleration in the same straight section as the laser. In this case, the mean electron energy change is zero even through energy exchange has taken place between the RF and the laser cavities. Care must be taken to minimize the betatron phase advance between the laser extraction section and the RF cavity. This cancellation can be best carried out if the acceleration is distributed along the wiggler magnets.

Since the electron microbunch also occupies a finite region of optical phase, some electrons will lose more energy to the laser than others. This effect produces an essentially incoherent transverse excitation which accumulates from pass to pass necessitating the introduction of additional synchrotron damping to stabilize the system. Two techniques can be used to minimize the incoherent excitation.

A first technique for reducing the incoherent excitation, applicable if the acceleration is distributed along the laser interaction region, is to select the laser intensity so that the total phase advance in this region is an integer multiple of $2\pi$. Under these circumstances, the net energy change of each electron is zero, and no transverse excitation occurs to first order. A residual excitation remains, however, caused by the nonlinearity of the laser interaction. The phase advance depends on the electron amplitude within the trap. Transverse excitation is then produced proportional to the deviation of an electron's phase advance from $2\pi$, which is a second order effect.

A second technique which can be utilized to minimize the transverse incoherent excitation is the excitation cancellation technique. Two additional degrees of freedom can be introduced into the design of the wiggler magnets in order to reduce the excitation of transverse oscillations. This can be done by introducing focusing into the magnet structure, and by appropriately tailoring the longitudinal variation of the magnetic field. In the simplest embodiment, excitation cancellation can be realized by choosing an optical phase slip within the laser which is an integral multiple of $\pi$ radians, and a betatron phase advance which differs from the optical phase slip by an integral multiple of $2\pi$ radians.

Since, as discussed above, the constraints on the storage ring parameters $\alpha$ and $\alpha_2$, the betatron phase advance in the bends and the net betatron phase advance are particularly stringent for this system, feedback technology may be necessary to correct for drifts and for initial errors in the bending and focusing magnetic fields. A variety of diagnostics are available to determine the actual values of these parameters, including the synchrotron frequency, the betatron phase advance in the bends and the net betatron phase advance (the tune), the gross phase of the electron bunch in the RF buket, and the laser power output. The laser power output is evidently a straight power level to monitor, while the value of the other parameters can be measured using pickup electrodes coupled to the circulating electron beam within the vacuum chamber.

General Characteristics

To take advantage of the first-order, excitation-free interaction, the equilibrium distribution should be contained within the optical traps in both the transverse and longitudinal dimensions. The emittance of the beam must be small enough to satisfy Equation (4-7) with a tolerance of perhaps 6 standard deviations, and the ring design must produce a momentum compaction, A, small enough so that large traps can be established to hold the equilibrium energy spread. Failure to satisfy either of these aperture requirements will result in charge leakage from the traps and a degradation of both power and efficiency. If the charge has been trapped in an optical potential well outside of the RF bucket, such leakage would also result in permanent charge loss, and a reduced beam lifetime.

From its initial oscillations in the RF bucket, the charge distribution is symmetrically disposed across the optical phase. If one assumes, for simplicity, that the laser field is created by injection from an external laser, then the traps are established suddenly, trapping a fraction of the initial distribution. The remaining electrons now travel orbits displaced to larger energies and begin to damp down into the traps. Meanwhile, the electrons in the traps which are accelerated by the cavity are emitting into the laser. Those in a like number of traps at the other end of the initial bunch absorb from the laser, producing zero net gain. However, by arranging for the light to overlap the same electrons on each pass, the result is achieved wherein the absorbing electrons eliminate the field confining them and damp down toward the self-sustaining emitting traps. The result is an asymmetric distribution of trapped electrons, all radiating strongly into the laser at a rate controlled by their RF phase.

SPECIFIC EXAMPLES

As an example, consider the performance of an isochronous 1-micron storage-ring laser in a 100-meter circumference, 100-MeV ring. For a simple helical magnet of 175 periods of wavelength 3.8 cm and with field strength of 2.8 kG, a 1-MW/cm$^2$ optical field will create traps large enough to contain the natural energy spread with an aperture of more than $13\sigma_e$. The requirements that the ring be sufficiently isochronous and that the net phase slip D be small then implies the values of the momentum compaction factor $\alpha = -0.7 \times 10^{-5}$, the emittance $\epsilon = 10^{-7}$ m·rad (for $U/\phi^2 = 0.5$), and the length misalignment $\Delta z \leq 1.2\mu$. If the voltage is adjusted so that $U/\phi^2 = 0.5$, traps in this neighborhood radiate an average power of $P_{out} = 32$ Kilowatts/amp (current stored in traps). In contrast, the synchrotron power is 100 watts/amp stored in the ring, for a damping time of $10^6$ turns. If all the charge in the ring can be stored in the traps, the efficiency of the laser is determined primarily by the net RF handling efficiencies, which can be higher than 50%.

Consider a relaxation of the constraint of momentum compaction factor, taking a value of $\alpha = -10^{-4}$, and laser intensity of 1.6 kilowatt/cm$^2$. This corresponds to $\phi = 0.24$, $A = -28$. If $U/\phi^2 = 0.5$, this leads to an output power of 1.3 kilowatts per amp which is, while less than the example above, still respectable. However, in this example, the trap aperture is only 0.62 $\sigma_e$, so that not much of the current in the ring represents electrons that are stored in the trap. The value of emittance of this example is $\epsilon = 6.5 \times 10^{-7}$ m·rad.

While the above examples illustrate rather stringent constraints on momentum compaction factors and other parameters, consider a laser operable in the far infrared, that is a 100-micron laser is a 250-Mev ring. For a laser intensity of 100 kw/cm$^2$, and values of $\phi = 1$, $A = -6$ and $U/\phi^2 = 0.2$, with 75 magnet periods, and a momentum compaction factor of $1.05 \times 10^{-3}$, an output power of 53 kilowatts/amp is achieved with the trap aperture = 7.26 $\sigma_e$. Thus, it can be seen that operation in the far infrared places less severe constraints on the storage ring parameters.

Alternate Embodiments

FIG. 8A is a schematic of an alternate embodiment in which several laser interaction regions are distributed at various points throughout the storage ring. Since the above requirements on the design of the storage ring apply to the arc between successive lasers, this system allows a larger momentum compaction for the storage ring system, while at the same time producing more total power. The system comprises four laser sections 101 interspersed with RF acceleration stages 102, path length correcting elements 103, and magnetic transport systems 104. The laser outputs 105 are now four times as numerous and the total momentum compaction four times larger than would be the case with only one laser section in this ring.

FIG. 8B shows a refinement on this where at least one of laser sections 101 is replaced with a plurality of laser subsections 110 interspersed by acceleration stages 112. This produces higher power output.

FIG. 9 is a schematic of an alternate embodiment comprising a linear sequence of laser magnet stages interspersed by acceleration sections 122, a device which is essentially an unfolded storage ring. Electrons can be trapped in the linear system in the same way as in the storage ring, provided that the restrictions of Equations (4-2), (4-3), (4-6), and (4-7) are satisfied. The electrons can be adiabatically prebunched with the laser and injected into the optical traps of the linear structure. A highly efficient single-pass system can be designed without the necessity to construct an expensive, strongly tapered magnet structure. An additional measure of control is also available because of the individual adjustability of the cavity voltages, which regulate the power and the gain of the laser system. The system is modular and can be expanded at will to increase the total gain of the system.

FIG. 10 illustrates a feature of the present invention that makes possible the generation and use of coherent synchrotron radiation. A laser section 215 is shown in a storage ring 225 having curved sections 225a, 225b, 225c, and 225d. While the normal synchrotron radiation in a storage ring is incoherent, representing the stochastic superposition of individual bursts of radiation, when the laser has introduced bunching on the order of the optical wavelength, and where the system is sufficiently isochronous to preserve this bunching from pass-to-pass, the amplitudes of the synchrotron radiation component at the bunch separation frequency interfere constructively to produce a coherent enhancement at that frequency. This coherent synchrotron radiation is shown schematically as bundles 230. It should be noted that the synchrotron radiation is concentrated in a narrow vertical angular dimension, being confined within a characteristic angle of $1/\gamma$, but is stretched out over a large angular range in the horizontal dimension (typically 90° in each of the four bends). Thus, depending on the application, should focusing to a point be required, a concentrating mirror such as indicated at 240 is used. Conversely, should it be desired to illuminate an extended vertical region with the coherent synchrotron radiation, a cylindrical lens for vertical defocusing, as shown at 250 is used.

We claim:
1. A storage ring free electron laser comprising:
   means defining a laser section in which a relativistic electron beam is caused to undergo periodic transverse deflections;
   means for propagating an electromagnetic wave defining a laser field in the vicinity of said laser section, said laser section and said laser field being characterized by a laser phase advance $\phi$ which is proportional to the square root of the laser field amplitude;
   storage ring means for extracting said beam from said laser section and reinjecting said beam into said laser section so that said electron beam makes repeated passes through said storage ring means, said storage ring means being characterized by an electron trajectory length L outside said laser section, a normalized exterior momentum compaction factor A, a trajectory envelope function, and a normal- ized emittance D which is a measure of the transverse extent of said beam; and acceleration means for restoring to said beam energy lost in said laser section and in said storage ring menas, said acceleration means being characterized by a normalized cavity acceleration U;

said normalized exterior momentum compaction factor, said normalized emittance, said normalized cavity acceleration, and said trajectory envelope function being constrained such that said storage ring means is sufficiently isochronous that the electrons' optical phase is well correlated from one pass to the next;

said laser phase advance and said normalized exterior momentum compaction factor being constrained to lie within stability boundaries resulting in stable points in electron phase space;

said normalized cavity acceleration and said laser phase advance being constrained so that said stable points in electron phase space remain separated from unstable points in electron phase space;

whereupon a significant fraction of the electrons within said beam are trapped in laser potential wells so that a longitudinally bunched structure on the scale of the wavelength of said electromagnetic wave is imparted to said beam and the longitudinally bunched structure of said beam at exit from said laser section is substantially preserved until said beam is reinjected into said laser section at said well correlated optical phase.

2. The invention of claim 1 wherein $U/\phi^2$ is less than 1.

3. The invention of claim 1 wherein A and $\phi$ are selected to provide phase stable points with A lying between $(2/\phi) \tan (\phi/2)$ and $-(2/\phi) \cot (\phi/2)$ or between $(2/\phi) \tan h(\phi/2)$ and $(2/\phi) \cot h(\phi/2)$.

4. The invention of claim 3 wherein $|A| < 2$.

5. The invention of claim 3 wherein $U/\phi^2$ is less than 1.

6. The invention of claim 1 wherein said storage ring means causes the electrons in said beam to move in an RF potential well, called an RF bucket, and wherein said storage ring means is characterized by a momentum compaction factor $\alpha$ and a second order coefficient $\alpha_2$ such that $\alpha/\alpha_2$ is greater than or equal to twice the minimum energy aperture to maintain said beam within said RF bucket for the desired operating time of said storage ring free electron laser.

7. The invention of claim 1, and further comprising path length correction means within said storage ring means to stabilize the mean orbit length of said beam within said storage ring means to within less than a laser wavelength.

8. The invention of claim 1 wherein said means for propagating an electromagnetic wave comprises an optical resonance cavity, and further comprising means for maintaining the length of said optical resonance cavity stable to about one-quarter of the wavelength of said electromagnetic wave so that the bunches of said beam may be injected into said laser section at the desired laser phase.

9. The invention of claim 1 wherein said storage ring means is characterized by said trajectory envelope function and by a magnetic field, said trajectory envelope function and said magnetic field being constrained such that the longitudinal displacement of electrons in said beam due to betatron oscillations is zero to first order in the transverse amplitude.

10. The invention of claim 1 wherein said storage ring means includes curved portions and a straight section, and further comprising matched focusing means in said straight section to enable adjustment of the overall storage ring tune independent of the tune in said curved portions.

11. The invention of claim 1, and further comprising means for controlling said electron trajectory length L.

12. A free electron laser system comprising:
means for providing an evacuated channel having a longitudinal axis;
beam transport means for extracting a relativistic electron beam from said channel and injecting said beam into said channel in a direction generally parallel to said axis for repetitive passage of said beam through said channel;
means for propagating an electromagnetic wave defining a laser field in at least a region of said channel;
means for impressing an undulating transverse motion on the electrons in said beam over at least a part of said region of said channel in which said electromagnetic wave is supported to define a laser interaction region in which said undulating transverse motion of said beam couples to said laser field and transfers energy from said beam to said electromagnetic wave; and
acceleration means for restoring to said beam energy lost in the passage of said beam through said laser interaction region and through said beam transport means;
said acceleration means, said beam transport means, and said laser field being configured for sufficient isochronism that the optical phases of said electrons are correlated between repetitions of said beam's passing through said laser interaction region, thus permitting first order energy transfer to occur;
said laser field, said acceleration means, and said beam transport means being configured to stably trap a significant fraction of said beam within laser field potential wells and thus cause a longitudinal bunching of said beam on the scale of the wavelength of said electromagnetic wave;
whereupon said isochronism preserves said longitudinal bunching which in combination with said optical phases' being correlated causes first order energy transfer to occur.

13. The invention of claim 12 wherein said beam transport means comprises a storage ring which is characterized by values of momentum compaction factor and trajectory envelope function, said values being constrained so that the electron orbit time in said storage ring is kept substantially independent of the electron state parameters relating to energy, direction, and position in bunch at the point of entering said storage ring.

14. The invention of claim 13 wherein said acceleration means includes a plurality of RF accelerating cavities distributed along said means for impressing.

15. The invention of claim 12 wherein said means for supporting comprises a plurality of mirrors defining a resonant optical cavity for oscillation.

16. The invention of claim 12, and further comprising:
means for providing a signal representative of a change in the length of said resonant optical cavity;

means responsive to said signal representative of a change for providing a corresponding correction signal; and means coupled to at least one of said mirrors and responsive to said correction signal for moving said one of said mirrors by an amount so as to offset said change.

17. The invention of claim 12 wherein said acceleration means comprises an RF accelerating cavity disposed in the path of said electron beam for acceleration of said beam between successive passages of said beam through said laser interaction region.

18. The invention of claim 12 wherein said acceleration means acts on said beam during passage of said beam through said laser interaction region.

19. A free electron laser system comprising:
means defining first and second laser sections in which a relativistic electron beam is caused to undergo periodic transverse deflections;
means for propagating electromagnetic waves defining respective first and second laser fields in the vicinity of said laser sections, said laser sections and said laser fields being characterized by respective laser phase advances;
means for injecting said beam into said first laser section;
beam transport means for extracting said beam from said first laser section and injecting said beam into said second laser section so that said electron beam passes serially through said laser sections, said beam transport means being characterized by a normalized exterior momentum compaction factor A, a trajectory envelope function, and a normalized emittance D which is a measure of the transverse extent of said beam; and
acceleration means for restoring to said beam energy lost in said first laser section, said acceleration means being characterized by a normalized cavity acceleration U;
said normalized exterior momentum compaction factor, said normalized emittance, said normalized cavity acceleration, and said trajectory envelope function being constrained such that said beam transport means is sufficiently isochronous that the electrons' optical phase is well correlated between extraction from said first laser section and injection into said second laser section;
the laser phase advance that characterizes one of said laser fields and said normalized exterior momentum compaction factor being constrained to lie within stability boundaries so as to result in stable points in electron phase space;
said normalized cavity acceleration and the laser phase advance that characterizes one of said laser fields being constrained so that said stable points in electron phase space remain separated from unstable points in electron phase space;
whereupon a significant fraction of the electrons within said beam are trapped in laser potential wells so that a longitudinally bunched structure on the scale of the wavelength of said electromagnetic wave is substantially preserved until said beam is injected into said second laser section at said well correlated optical phase.

20. The invention of claim 19, and further comprising means for extracting said beam from said second laser section and thereafter directing said beam to said means for injecting said beam into said first laser section so that said electron beam makes repeated passes through said first and second laser sections.

21. The invention of claim 19, and further comprising pre-bunching means for imparting to said beam a longitudinally bunched structure on the scale of the wavelength of said electromagnetic wave prior to said beam's being injected into said first laser section.

22. A free electron laser system comprising:
means for providing first and second evacuated channel regions;
means for injecting a relativistic electron beam into said first channel region;
beam transport means for extracting said beam from said first channel region and injecting said beam into said second channel region for serial passage of said beam through said first and second channel regions;
means for propagating electromagnetic waves defining first and second laser fields in at least a portion of each of said channel regions;
means for impressing an undulating transverse motion on the electrons in said beam over at least a part of each of said portions of said channel regions in which said electromagnetic waves are supported to define respective first and second laser interaction regions in which said undulating transverse motion of said beam couples to said laser fields and transfers energy from said beam to said electromagnetic waves; and
acceleration means for restoring to said beam energy lost in the passage of said beam through said first laser interaction region and through said beam transport means;
said acceleration means, said beam transport means, and said laser fields being configured for sufficient isochronism that the optical phases of said electrons are correlated between said beam's leaving said first laser interaction region and said beam's entering said second laser interaction region, thus permitting first order energy transfer to occur;
said laser field, said acceleration means, and said beam transport means being configured to stably trap a significant fraction of said beam within laser field potential wells and thus cause a longitudinal bunching of said beam on the scale of the wavelength of said electromagnetic wave;
whereupon said isochronism preserves said longitudinal bunching which in combination with said optical phases' being correlated causes first order energy transfer to occur.

23. A method of illuminating an object with coherent synchrotron radiation comprising the steps of:
(a) providing a storage ring free electron laser which includes
means for providing an evacuated channel having a longitudinal axis,
beam transport means for extracting a relativistic electron beam from said channel and injecting said beam into said channel in a direction generally parallel to said axis for repetitive passage of said beam through said channel said beam transport means having a curved portion,
means for propagating an electromagnetic wave defining a laser field in at least a region of said channel, and
means for impressing an undulating transverse motion on the electrons in said beam over at least a part of said region of said channel in which said electromagnetic wave is supported to define a laser interaction region in which said undulating transverse motion of said beam couples to said laser field and transfers energy from said beam to said electromagnetic wave, and acceleration means for restoring to said beam energy lost in the passage of said beam through said laser interaction region and through said beam transport means, said acceleration means, said beam transport means, and said laser field being configured for sufficient isochronism that the optical phases of said electrons are correlated between repetitions of said beam's passing through said laser interaction region, thus permitting first order energy transfer to occur, said laser field, said acceleration means, and said beam transport means being configured to stably trap a significant fraction of said beam within laser field potential wells and thus cause a longitudinal bunching of said beam on the scale of the wavelength of said electromagnetic wave, whereupon said isochronism preserves said longitudinal bunching which in combination with said optical phases' being correlated causes first order energy transfer to occur;

(b) operating said storage ring free electron laser; and
(c) placing said object to be illuminated near said curved portion of said storage ring.

* * * * *